United States Patent
Yamazaki et al.

(10) Patent No.: US 7,285,161 B2
(45) Date of Patent: Oct. 23, 2007

(54) WATER BASE PIGMENT INK FOR INK-JET RECORDING

(75) Inventors: Hideto Yamazaki, Nagoya (JP); Michiko Aoyama, Nagoya (JP); Yoshito Toyoda, Nagoya (JP); Mayuko Okada, Toyota (JP); Tatsunosuke Hoshi, Nagoya (JP); Masaya Fujioka, Nagoya (JP); Shunichi Higashiyama, Yotsukaichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 10/624,989

(22) Filed: Jul. 22, 2003

(65) Prior Publication Data
US 2004/0182282 A1    Sep. 23, 2004

(30) Foreign Application Priority Data
Jul. 23, 2002    (JP) .............................. 2002-214198

(51) Int. Cl.
*C09D 11/02* (2006.01)

(52) U.S. Cl. .................................. 106/31.86
(58) Field of Classification Search .............. 106/31.86
See application file for complete search history.

(56) References Cited

U.S. PATENT DOCUMENTS

| | | | | |
|---|---|---|---|---|
| 4,574,057 | A * | 3/1986 | Kaza et al. ............... | 526/238.3 |
| 5,580,374 | A * | 12/1996 | Okumura et al. ............. | 524/84 |
| 5,596,027 | A * | 1/1997 | Mead et al. ................ | 523/161 |
| 6,013,124 | A * | 1/2000 | Saibara et al. ........... | 106/31.86 |
| 6,070,310 | A | 6/2000 | Ito et al. | |
| 6,114,411 | A | 9/2000 | Nakamura et al. | |
| 6,247,782 | B1 | 6/2001 | Takata | |
| 6,390,710 | B1 * | 5/2002 | Miyamoto ................... | 401/215 |
| 6,461,418 | B1 * | 10/2002 | Yue et al. ................ | 106/31.58 |
| 6,475,271 | B2 * | 11/2002 | Lin ......................... | 106/31.27 |
| 6,478,862 | B1 * | 11/2002 | Elwakil ...................... | 106/31.6 |
| 6,613,136 | B1 | 9/2003 | Arita et al. | |
| 6,638,350 | B2 * | 10/2003 | Butler et al. ............. | 106/31.28 |
| 6,676,734 | B2 * | 1/2004 | Nagashima et al. ..... | 106/31.32 |
| 6,676,736 | B2 * | 1/2004 | Nakano et al. ......... | 106/31.58 |
| 6,730,155 | B2 * | 5/2004 | Gotoh et al. ............. | 106/31.86 |
| 6,793,724 | B2 * | 9/2004 | Satoh et al. ............. | 106/31.89 |
| 2001/0023651 | A1 * | 9/2001 | Hattori et al. ............. | 106/31.7 |

FOREIGN PATENT DOCUMENTS

| | | |
|---|---|---|
| JP | 8176481 | 7/1996 |
| JP | 8239610 | 9/1996 |
| JP | 9176533 | 7/1997 |
| JP | 11-172170 | 6/1999 |
| JP | 2001-254037 | 9/2001 |

\* cited by examiner

*Primary Examiner*—Melissa Koslow
*Assistant Examiner*—Veronica Faison-Gee
(74) *Attorney, Agent, or Firm*—Reed Smith LLP

(57) ABSTRACT

A water base pigment ink for ink-jet recording contains a pigment, water, and at least one of polyethylene glycol and diglycerol. The ink is solidified into a solid matter when the water is evaporated. Further, the solid matter is redissolved in the unsolidified water base pigment ink for ink-jet recording. When the ink is used, then neither clog-up of a nozzle nor discharge failure is caused, no load is imposed by the solidified ink on the maintenance system such as the wiping equipment, and the sticking performance on the paper is satisfactory.

9 Claims, 1 Drawing Sheet

WATER BASE PIGMENT INK FOR INK-JET RECORDING

BACKGROUND OF THE INVENTION

1. Field of the Invention

The present invention relates to a water base pigment ink for ink-jet recording which causes neither clog-up nor discharge failure, which imposes no load by any solidified ink on the maintenance system such as the wiping equipment, and which has good sticking performance on paper.

2. Description of the Related Art

In the ink-jet recording system, ink droplets are formed by means of the ink discharge method including, for example, the electrostatic attraction method, the method in which mechanical vibration or displacement is applied to the ink by using a piezoelectric element, and the method in which bubbles are generated by heating the ink to utilize the pressure generated thereby. All or a part of the ink droplets are adhered to a recording objective material such as paper to perform the recording.

Those used as the ink for ink-jet recording to be employed for the ink-jet recording system as described above include those in which a variety of water-soluble dyes or pigments are dissolved or dispersed in liquid media each comprising water or a combination of water and water-soluble organic solvent. It is required, for example, for the ink for ink-jet recording that neither precipitation nor aggregation appears even when the ink is not used for a long period of time, no clog-up occurs in the ink flow passage and at the tip of the head of the ink-jet printer, the printing quality is satisfactory, and the weather resistance is excellent.

The dye and the pigment may be compared with each other as follows. That is, the dye is inferior in water resistance, because the dye is completely dissolved in the ink medium composed of water or a combination of water and water-soluble organic solvent. The dye is also considerably inferior in light resistance because of its chemical structure. On the other hand, the pigment is extremely superior in weather resistance including water resistance, because the pigment is not dissolved in the ink medium but dispersed therein. In particular, the pigment ink is easily solidified after the evaporation of water. When the pigment ink is once solidified on the paper surface, the strong bonding appears between the pigment and the paper. Therefore, the pigment ink is more excellent in sticking performance than the dye ink. Further, when the pigment ink contains a resin as a dispersing agent or a binder, this function is further facilitated. Therefore, the ink for ink-jet recording is gradually changed from the dye ink to the pigment ink in recent years.

However, in the case of the pigment ink, when the water contained in the ink is evaporated to cause the solidification, then the pigment ink remains solidified, and the ink is not redissolved. Therefore, any clog-up is caused, for example, at the tip of the nozzle of the ink-jet head, and thus the discharge failure of the ink has been hitherto caused. When the ink is solidified, for example, at the cap and the wiping portion, it is difficult to perform, for example, the wiping operation. A problem arises such that the load is imposed on the maintenance system.

SUMMARY OF THE INVENTION

The present invention has been made in order to solve the problems as described above, an object of which is to provide a water base pigment ink for ink-jet recording which causes neither clog-up nor discharge failure, which imposes no load by any solidified ink on the maintenance system such as the wiping equipment, and which has good sticking performance on paper.

According to the present invention, there is provided an ink for ink-jet recording comprising a pigment; water; and at least one of polyethylene glycol and diglycerol. The ink of the present invention may further contain a water-soluble organic solvent, wherein a blending amount of at least one of the polyethylene glycol and the diglycerol may be not less than 10% by weight with respect to a total amount of the water-soluble organic solvent including at least one of the polyethylene glycol and the diglycerol. When the blending amount of at least one of the polyethylene glycol and the diglycerol is controlled as described above, any solid matter, which is solidified as a result of the evaporation of the water contained in the ink, can be redissolved in the ink. When the ink of the present invention does not contain the polyethylene glycol and the ink contains the diglycerol, then the diglycerol may be contained by not less than 50% by weight with respect to the total amount of the water-soluble organic solvent including the diglycerol. In order to obtain the good sticking performance on the paper when the water contained in the ink is evaporated, a weight ratio of at least one of the polyethylene glycol and the diglycerol with respect to the pigment may be not more than 3. At least one of the polyethylene glycol and the diglycerol to be used may be in a form of liquid at ordinary (room) temperature and ordinary (atmospheric) pressure.

The ink for ink-jet recording of the present invention is solidified into the solid matter when the water contained in the ink is evaporated. Further, the solid matter can be redissolved in the unsolidified ink for ink-jet recording of the present invention. In this way, even when the ink for ink-jet recording of the present invention is once solidified, the solidified ink is redissolved in the unsolidified ink of the present invention newly supplied from the nozzle by making the contact therewith. Therefore, the discharge failure, which would be otherwise caused by the clog-up, is not caused, for example, at the nozzle tip of the ink-jet head, and no load is imposed on the maintenance system such as the wiping equipment.

According to the present invention, there is also provided an ink cartridge comprising the ink for ink-jet recording of the present invention.

DESCRIPTION OF THE PREFERRED EMBODIMENTS

Figure 1:
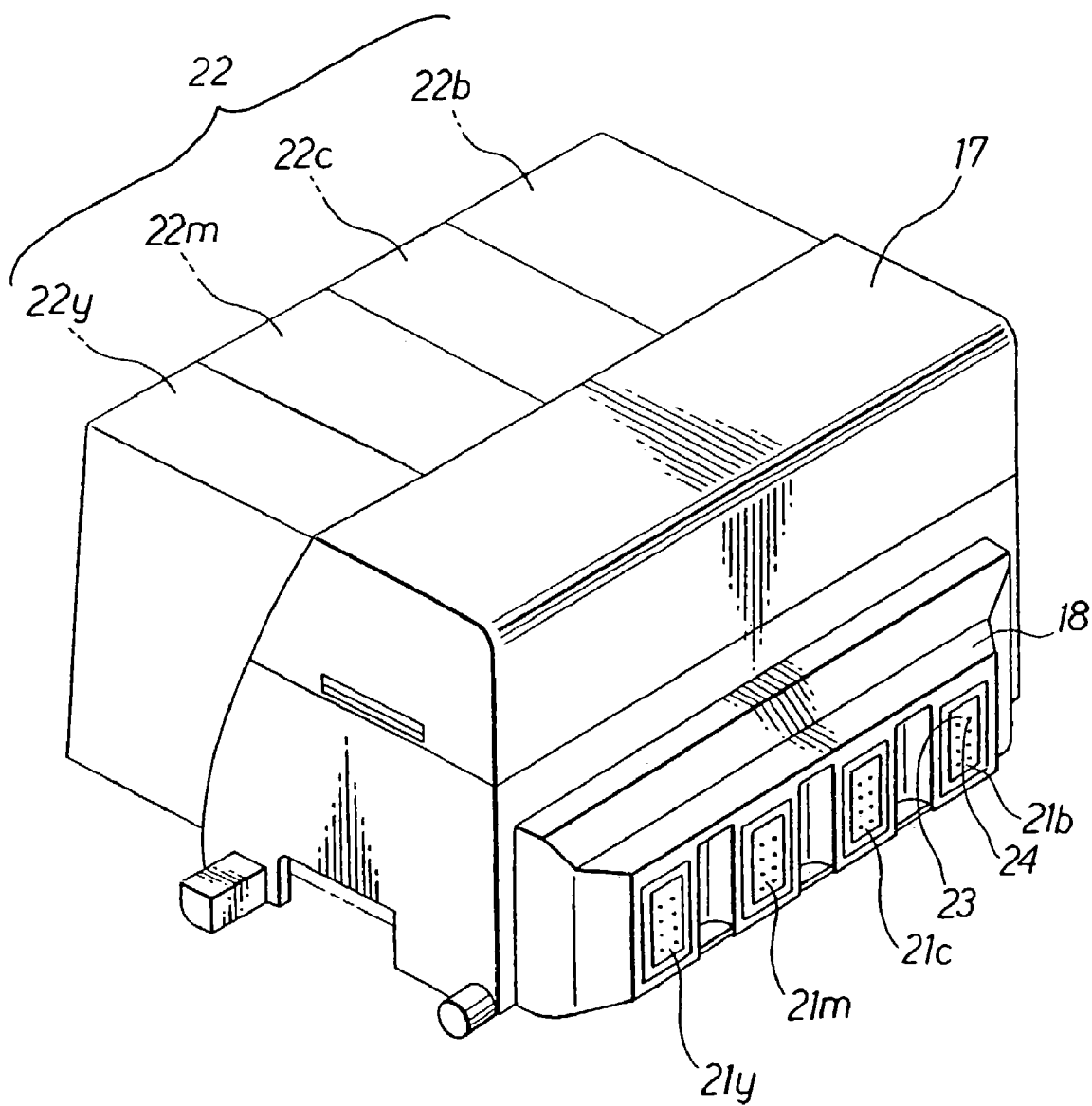
FIG. 1 shows an ink jet head which ejects four color inks and is provided with a color ink cartridge which contains the water base pigment ink for ink-jet recording in accordance with the invention.

The water base pigment ink for ink-jet recording of the present invention contains the pigment, the water, and the water-soluble organic solvent. The pigment is not specifically limited, for which it is possible to use any one of inorganic pigments and organic pigments. Those usable for the black-and-white recording may include, for example, carbon blacks such as Furnace Black, Lamp Black, Acetylene Black, and Channel Black; metal oxides such as titanium oxide, and organic pigments such as Orthonitroaniline Black. Those usable for the color recording may include, for example, Toluidine Red, Permanent Carmine FB, Fast Yellow AAA, Disazo Orange PMP, Lake Red C, Brilliant Carmine 6B, Phthalocyanine Blue, Quinacridone Red, Dioxane Violet, Pictorial Pure Blue, Alkali Blue Toner, Fast Yellow 10G, Disazo Yellow AAOT, Disazo Yellow AAMX, Disazo Yellow HR, Disazo Yellow AAOA, yellow iron oxide, Orthonitroaniline Orange, Dinitroaniline Orange, Vulcan Orange, Toluidine Red, Chlorinated Para Red, Brilliant Fast Scarlet, Naphthol Red 23, Pyrazolone Red, Barium Red 2B, Calcium Red 2B, Strontium Red 2B, Manganese Red 2B, Barium Lissome Red, Pigment Scarlet 3B Lake, Lake Bordeaux 10B, Anthosin 3B Lake, Anthosin 5B Lake, Rhodamine 6G Lake, Eosin Lake, red iron oxide, Naphthol Red FGR, Rhodamine B Lake, Methyl Violet Lake, Dioxane Violet, Basic Blue 5B Lake, Basic Blue 6G Lake, Fast Sky Blue, Alkali Blue R Toner, Peacock Blue Lake, indigo blue, navy blue, Reflex Blue 2G, Reflex Blue R, Brilliant Green Lake, Diamond Green Thioflavine Lake, Phthalocyanine Green G, Green Gold, Phthalocyanine Green Y, iron oxide, rust powder, zinc oxide, titanium oxide, calcium carbonate, clay, barium sulfate, alumina white, aluminum, bronze, daylight fluorescent pigment, pearl pigment, Naphthol Carmine FB, Naphthol Red M, Permanent Carmine FB, Fast Yellow G, Disazo Yellow AAA, Alkali Blue G Toner, and surface-modified pigment having a surface treated with a specified functional group.

The blending amount of the pigment is determined depending on the coloration and the desired printing density. However, even when the blending amount is not more than 10% by weight, it is possible to obtain a sufficient coloring power and a high vividness. The blending amount of the pigment is preferably 1 to 20% by weight, and more preferably 1 to 15% by weight with respect to the gross quantity of the water base pigment ink for ink-jet recording of the present invention.

As for the water, it is preferable to use deionized water rather than ordinary water which contains a variety of ions. The blending amount of the water is determined in a wide range depending on the type and the composition of solvent components other than the water and the desired characteristics of the ink. The blending amount of the water is preferably 10 to 90% by weight, and more preferably 15 to 80% by weight with respect to the gross quantity of the water base pigment ink for ink-jet recording of the present invention.

The water-soluble organic solvent may be classified, principally depending on the effect possessed thereby, into those which have the effect to improve the resolubility of the water base pigment ink for ink-jet recording of the present invention, those which have the effect as the moistening agent to avoid the drying of the ink at the tip of the ink-jet head, and those which have the effect as the permeating agent to quicken the drying speed on the paper surface. In particular, it is preferable to blend the water-soluble organic solvent which has the effect to improve the resolubility of the water base pigment ink for ink-jet recording of the present invention. The water-soluble organic solvent may be used singly, or two or more of the water-soluble organic solvents may be used in combination.

The water-soluble organic solvent, which has the effect to improve the resolubility of the water based pigment ink for ink-jet recording of the present invention, may be exemplified by polyethylene glycol and diglycerol which are in a form of liquid at ordinary temperature and ordinary pressure. The polyethylene glycol, which is in a form of liquid at ordinary temperature and ordinary pressure, may be exemplified, for example, by those having average molecular weights of 200 to 400. In particular, for example, polyethylene glycol #200 may be exemplified as those commercially available. Polyethylene glycol and diglycerol, which are in a form of liquid at ordinary temperature and ordinary pressure, may be used singly respectively. Alternatively, they may be used in combination. It is preferable that polyethylene glycol and/or diglycerol, which is in a form of liquid at ordinary temperature and ordinary pressure, is blended in a blending amount of not less that 10% by weight with respect to the gross quantity of the water-soluble organic solvent. If the blending amount is less that 10% by weight, the resolubility of the water based pigment ink for ink-jet recording of the present invention is not sufficient in some cases.

The water-soluble organic solvent, which has the effect to prevent the ink from being dried, may include, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or ketone alcohols such as acetone and diacetone alcohol; ethers such as tetrahydrofuran and dioxane; polypropylene glycols; alkylene glycols such as ethylene glycol, propylene glycol, butylene glycol, diethylene glycol, triethylene glycol, dipropylene glycol, tripropylene glycol, thiodiglycol, and hexylene glycol; glycerol; 2-pyrrolidone; N-methyl-2-pyrrolidone; and 1,3-dimethyl-2-imidazolidinone. In particular, polyvalent alcohols are generally used in many cases. It is preferable to use alkylene glycols such as glycerol and diethylene glycol.

The water-soluble organic solvent, which has the effect to quicken the drying speed on the paper surface, may include, for example, glycol-based ethers such as ethylene glycol monomethyl ether, ethylene glycol monoethyl ether, ethylene glycol monopropyl ether, diethylene glycol monomethyl ether, diethylene glycol monoethyl ether, diethylene glycol monopropyl ether, triethylene glycol monomethyl ether, triethylene glycol monoethyl ether, triethylene glycol monopropyl ether, propylene glycol monomethyl ether, propylene glycol monoethyl ether, propylene glycol monopropyl ether, dipropylene glycol monomethyl ether, dipropylene glycol monoethyl ether, dipropylene glycol monopropyl ether, tripropylene glycol monomethyl ether, tripropylene glycol monoethyl ether, and tripropylene glycol monopropyl ether.

It is preferable that the blending amount of the water-soluble organic solvent with respect to the pigment is not more than 3 in weight ratio. If the blending amount exceeds 3, then the water base pigment ink for ink-jet recording of the present invention is not solidified completely when the water is evaporated, and the sticking performance of the pigment with respect to the paper is lowered, when the water base pigment ink for ink-jet recording of the present invention contains the water-soluble organic solvent such as glycerol which is extremely hardly evaporated. As a result, the printed image is disturbed when the printed surface is touched after the printing in some cases, and the ink adheres to the hand in other cases. When the blending amount is not more than 3, then the water base pigment ink for ink-jet recording of the present invention is solidified when the water is evaporated, and thus the ink is excellent in sticking performance on the paper.

The water base pigment ink for ink-jet recording of the present invention may contain a dispersing agent, if necessary. The dispersing agent is not specifically limited, which may be exemplified, for example, by high molecular weight polyurethane, polyester, and high molecular weight copolymer having a functional group such as carbonyl group and amino group having the strong affinity with respect to the pigment.

The basic composition of the water base pigment ink for ink-jet recording of the present invention has been described above. However, if necessary, it is also allowable to contain a variety of conventionally known additives including, for example, viscosity-adjusting agents, surface tension-adjusting agents, and antifungal agents. The viscosity-adjusting agent is not specifically limited, which may be exemplified, for example, by polyvinyl alcohol, cellulose, and water-soluble resin.

The water base pigment ink for ink-jet recording of the present invention has the good sticking performance on the paper, because the ink is solidified when the contained water is evaporated. On the other hand, even when the ink is once solidified, for example, at the nozzle tip of the ink-jet head, the ink is redissolved upon the contact with the unsolidified water base pigment ink for ink-jet recording of the present invention newly supplied from the nozzle. Therefore, the discharge failure, which would be otherwise caused by the clog-up, is not caused. No load is imposed by the solidified ink on the maintenance system such as the wiping equipment.

EXAMPLES

The present invention will be explained in further detail below as exemplified by Examples. However, the present invention is not limited to only Examples.

Preparation of Pigment Mill Base 84 parts by weight of pure water, 4 parts by weight polyvinylpyrrolidone (Kollidon 12 PF produced by BASF), and 2 parts by weight of triethanolamine were agitated and mixed with each other for 10 minutes, and then 10 parts by weight of carbon black (MONARCH 880 produced by Cabot) was added thereto, followed by being agitated and mixed with each other for further 30 minutes to obtain a mixture.

A water-cooling type dispersing vessel (double vessel type, volume: 1 liter) of a pigment-dispersing machine (DISPERMAT CV produced by BYK Chemie) was filled with 700 g of zirconia beads having a diameter of 1 mm, and then 100 g of the obtained mixture was introduced thereinto to perform a dispersing treatment for 1 hour at 5000 rpm by using Pearl Mill Impeller MINI. An obtained dispersion was subjected to suction filtration through a metal mesh (Support Screen produced by Advantec Toyo Kaisha, Ltd.) to obtain 80 g of a black pigment mill base.

Preparation of Water Base Pigment Ink for Ink-jet Recording

Example 1

73 parts by weight of pure water, 14 parts by weight of glycerol, 1 part by weight triethanolamine, 4 parts by weight of dipropylene glycol propyl ether, and 8 parts by weight of polyethylene glycol #200 (molecular weight: 200) were agitated and mixed with each other for 10 minutes to prepare a letdown solvent. The letdown was effected by adding 50 g of the letdown solvent while agitating 50 g of the black pigment mill base to perform agitation and mixing for 30 minutes, followed by being filtrated through a membrane filter having a pore size of 1 μm to obtain a black ink K1.

Example 2

79 parts by weight of pure water, 6 parts by weight of glycerol, 1 part by weight triethanolamine, 4 parts by weight of dipropylene glycol propyl ether, and 10 parts by weight of diglycerol were agitated and mixed with each other for 10 minutes to prepare a letdown solvent. After that, the letdown and the filtration were performed in the same manner as in Example 1 to obtain a black ink K2.

Example 3

75 parts by weight of pure water, 1 part by weight triethanolamine, 4 parts by weight of dipropylene glycol propyl ether, and 20 parts by weight of diglycerol were agitated and mixed with each other for 10 minutes to prepare a letdown solvent. After that, the letdown and the filtration were performed in the same manner as in Example 1 to obtain a black ink K3.

Example 4

69 parts by weight of pure water, 22 parts by weight of glycerol, 1 part by weight triethanolamine, 4 parts by weight of dipropylene glycol propyl ether, 2 parts by weight of polyethylene glycol #200, and 2 parts by weight of diglycerol were agitated and mixed with each other for 10 minutes to prepare a letdown solvent. After that, the letdown and the filtration were performed in the same manner as in Example 1 to obtain a black ink K4.

Example 5

81 parts by weight of pure water, 16 parts by weight of glycerol, 1 part by weight triethanolamine, and 2 parts by weight of polyethylene glycol #200 were agitated and mixed with each other for 10 minutes to prepare a letdown solvent. After that, the letdown and the filtration were performed in the same manner as in Example 1 to obtain a black ink K5.

Comparative Example 1

67 parts by weight of pure water, 32 parts by weight of glycerol, and 1 part by weight triethanolamine were agitated and mixed with each other for 10 minutes to prepare a letdown solvent. After that, the letdown and the filtration were performed in the same manner as in Example 1 to obtain a black ink K6.

Comparative Example 2

75 parts by weight of pure water, 14 parts by weight of glycerol, 1 part by weight triethanolamine, 4 parts by weight of dipropylene glycol propyl ether, and 6 parts by weight of 2-pyrrolidone were agitated and mixed with each other for 10 minutes to prepare a letdown solvent. After that, the letdown and the filtration were performed in the same manner as in Example 1 to obtain a black ink K7.

Comparative Example 3

75 parts by weight of pure water, 12 parts by weight of glycerol, 1 part by weight triethanolamine, 4 parts by weight of dipropylene glycol propyl ether, and 8 parts by weight of diethylene glycol were agitated and mixed with each other for 10 minutes to prepare a letdown solvent. After that, the letdown and the filtration were performed in the same manner as in Example 1 to obtain a black ink K8.

Reference Example 4

77 parts by weight of pure water, 16 parts by weight of glycerol, 1 part by weight triethanolamine, 4 parts by weight of dipropylene glycol propyl ether, and 2 parts by weight of diglycerol were agitated and mixed with each other for 10 minutes to prepare a letdown solvent. After that, the letdown and the filtration were performed in the same manner as in Example 1 to obtain a black ink K9.

Reference Example 5

65 parts by weight of pure water, 1 part by weight triethanolamine, and 34 parts by weight of diglycerol were agitated and mixed with each other for 10 minutes to prepare a letdown solvent. After that, the letdown and the filtration were performed in the same manner as in Example 1 to obtain a black ink K10.

Evaluation of Water Base Pigment Ink for Ink-jet Recording

The obtained black inks K1 to K10 were evaluated in accordance with the following methods.

Evaluation 1

One drop of the black ink was dropped onto a slide glass, and the ink was spread to have a thin film-shaped form, followed by being left to stand for 24 hours in a thermostatic chamber at a temperature of 40° C. and a humidity of 30% to completely evaporate water contained in the black ink so that the solidification state of the black ink was confirmed. A case, in which the black ink was completely solidified, was indicated by "OK", and a case, in which the black ink was not completely solidified, was indicated by "NG". When the ink was completely solidified, the same type of the unsolidified black ink was allowed to contact with the solidified black ink to observe whether or not the black ink was redissolved under an optical microscope having a magnification of ×200. A case, in which the black ink was redissolved (completely dissolved and no solid matter was observed), was indicated by "OK", and a case, in which the black ink was not redissolved (a part of solid matter remained), was indicated by "NG".

Evaluation 2

An ink-jet head of the shearing mode type disclosed in U.S. Pat. No. 6,070,310 was used for jetting the ink from a plurality of jetting channels by driving a plurality of energy-generating devices for applying the jetting energy to the ink contained in the jetting channels formed in an actuator substrate. An ink-jet printer disclosed in U.S. Pat. No. 6,247,782B1 was used, comprising a connecting section with ink supply passages connected to an ink supply source while being opposed at substantially central portions of arrays formed by a plurality of ink supply ports, and an enlarged section allowed to extend from the connecting section toward both ends of the arrays formed by the plurality of ink supply ports in tapered configurations respectively to cover the plurality of ink supply ports, the enlarged section having an expanded wall to enter spaces between the plurality of arrays formed by the plurality of ink supply ports. The ink-jet head was carried on the ink-jet printer to perform arbitrary intermittent discharge for 1 minute and perform arbitrary discharge, followed by being left to stand for 1 week to perform discharge again so that the discharge performance was confirmed. A case, in which the discharge was satisfactory and the printing was successfully performed without any clog-up at the tip of the ink-jet head, was indicated by "OK", and a case, in which the discharge was unstable and any satisfactory printing was unsuccessful, was indicated by "NG".

Evaluation 3

After the printing performed to confirm the discharge performance in Evaluation 2, those disposed in the vicinity of the nozzle, the cap, and the wiping equipment of the ink-jet printer were visually observed. A case, in which no solid matter was adhered, was indicated by "OK", and a case, in which any solid matter was adhered, was indicated by "NG".

Evaluation 4

When the printing was successfully performed without causing any clog-up in Evaluation 2, the printed portion was rubbed with a finger 1 minute after the printing to confirm the sticking performance of the black ink on the paper. A case, in which the black ink was not adhered to the finger and the printed portion was not dirty, was indicated by "OK", and a case, in which the black ink was adhered to the finger and/or the printed portion was dirty, was indicated by "NG".

The compositions of the black inks K1 to K10, which are expressed in % by weight, and their evaluation results are shown in Table 1.

TABLE 1

|  | Ex. 1 | Ex. 2 | Ex. 3 | Ex. 4 | Ex. 5 | Comp. Ex. 1 | Comp. Ex. 2 | Comp. Ex. 3 | Ref. Ex. 4 | Ref. Ex. 5 |
| --- | --- | --- | --- | --- | --- | --- | --- | --- | --- | --- |
| Black ink | K1 | K2 | K3 | K4 | K5 | K6 | K7 | K8 | K9 | K10 |
| Carbon black (% by weight) | 5 | 5 | 5 | 5 | 5 | 5 | 5 | 5 | 5 | 5 |
| Polyethylene glycol (% by weight) | 4 | — | — | 1 | 1 | — | — | — | — | — |
| Diglycerol (% by weight) | — | 5 | 10 | 1 | — | — | — | — | 1 | 17 |
| Glycerol (% by weight) | 7 | 3 | — | 11 | 8 | 16 | 7 | 6 | 8 | — |
| 2-Pyrrolidone (% by weight) | — | — | — | — | — | — | 3 | — | — | — |
| Diethylene glycol (% by weight) | — | — | — | — | — | — | — | 4 | — | — |
| Dipropylene glycol propyl ether (% by weight) | 2 | 2 | 2 | 2 | — | — | 2 | 2 | 2 | — |
| Triethanolamine (% by weight) | 1.5 | 1.5 | 1.5 | 1.5 | 1.5 | 1.5 | 1.5 | 1.5 | 1.5 | 1.5 |
| Polyvinylpyrrolidone (% by weight) | 2 | 2 | 2 | 2 | 2 | 2 | 2 | 2 | 2 | 2 |
| Pure water (% by weight) | 78.5 | 81.5 | 79.5 | 76.5 | 82.5 | 75.5 | 79.5 | 79.5 | 80.5 | 74.5 |

TABLE 1-continued

|  |  | Ex. 1 | Ex. 2 | Ex. 3 | Ex. 4 | Ex. 5 | Comp. Ex. 1 | Comp. Ex. 2 | Comp. Ex. 3 | Ref. Ex. 4 | Ref. Ex. 5 |
|---|---|---|---|---|---|---|---|---|---|---|---|
| Water-soluble organic solvent in total (% by weight) | | 13 | 10 | 12 | 15 | 9 | 16 | 12 | 12 | 11 | 17 |
| Weight ratio of blending amount of water-soluble organic solvent with respect to blending amount of pigment | | 2.6 | 2.0 | 2.4 | 3.0 | 1.8 | 3.2 | 2.4 | 2.4 | 2.2 | 3.4 |
| Blending of polyethylene glycol and diglycerol in organic solvent (% by weight) | | 30.8 | 50.0 | 83.3 | 13.3 | 11.1 | 0.0 | 0.0 | 0.0 | 9.1 | 100.0 |
| Evaluation (1) | Solidification state | OK | OK | OK | OK | OK | NG | OK | OK | OK | NG |
|  | Resolubility | OK | OK | OK | OK | OK | — | NG | NG | NG | — |
| Evaluation (2) | Discharge performance | OK | OK | OK | OK | OK | OK | NG | NG | NG | OK |
| Evaluation (3) | Adhesion of solid matter | OK | OK | OK | OK | OK | OK | NG | NG | NG | OK |
| Evaluation (4) | Sticking performance on paper | OK | OK | OK | OK | OK | NG | — | — | — | NG |

In the case of any one of the black inks K1 to K5 prepared in Examples 1 to 5, the ink was solidified into the solid matter when the water contained in the ink is evaporated. Further, the solid matter was redissolved upon the contact with the same type of the unsolidified black ink. Neither clog-up nor discharge failure was caused, and the discharge performance was satisfactory. Further, the sticking performance on the paper was satisfactory as well. On the contrary, in the case of the black inks K6 to K8 prepared in Comparative Examples 1 to 3 and the black inks K9 and K10 prepared in Reference Examples 4 and 5, the discharge performance was unsatisfactory and/or the sticking performance on the paper was unsatisfactory. The black inks prepared in Comparative Examples 1 to 3 and Reference Examples 4 and 5 were inferior in any one of the evaluations.

An embodiment of an ink cartridge which contains the water base pigment ink in accordance with the invention is shown in FIG. 1. The ink cartridge 22 has four compartments 22b, 22c, 22m, 22y which contain the black ink, cyan ink, magenta ink and yellow ink as prepared in the above examples, respectively. The compartment 22b, 22c, 22m, 22y may be formed integrally or independently. The ink cartridge 22 is removably installed on an ink jet head 18. The ink jet head 18 has nozzle heads 21b, 21c, 21m, 21y which communicate with the compartment 22b, 22c, 22m, 22y to eject the black ink, cyan ink, magenta ink and yellow ink, respectively. A plurality of nozzles 24 are formed on the surface 23 of each nozzle head. The ink jet head is typically mounted on a carriage 17 which moves on and along a surface of a recording sheet.

According to the present invention, it is possible to provide the water base pigment ink for ink-jet recording which causes neither clog-up nor discharge failure, which imposes no load by any solidified ink on the maintenance system such as the wiping equipment, and which has the satisfactory sticking performance on the paper.

What is claimed is:

1. An ink for ink-jet recording comprising:
 a pigment;
 water; and
 diglycerol;
 wherein the ink is solidified into a solid matter when the water contained in the ink is evaporated, and the solid matter is redissolved in the ink which is not solidified; and
 wherein a weight ratio of the diglycerol with respect to the pigment is not more than 3.

2. The ink for ink-jet recording according to claim 1, further comprising a water-soluble organic solvent, wherein a blending amount of the diglycerol is not less than 10% by weight with respect to a total amount of the water-soluble organic solvent including the diglycerol.

3. The ink for ink-jet recording according to claim 1, wherein the diglycerol is in a form of liquid at ordinary temperature and ordinary pressure.

4. The ink for ink-jet recording according to claim 1, wherein the diglycerol is contained by not less than 50% by weight with respect to the total amount of the water-soluble organic solvent including the diglycerol.

5. An ink cartridge comprising the ink for ink-jet recording as defined in claim 1.

6. An ink for ink-jet recording consisting essentially of:
 a pigment;
 water;
 polyethylene glycol; and
 diglycerol;
 wherein a weight ratio of the polyethylene glycol and the diglycerol with respect to the pigment is not more than 3.

7. The ink for ink-jet recording according to claim 6, wherein the ink is solidified into a solid matter when the water contained in the ink is evaporated, and the solid matter is redissolved in the ink which is not solidified.

8. The ink for ink-jet recording according to claim 7, wherein the polyethylene glycol and the diglycerol is in a form of liquid at ordinary temperature and ordinary pressure.

9. An ink cartridge comprising the ink for ink-jet recording as defined in claim 6.

* * * * *